United States Patent
Liu et al.

(10) Patent No.: US 11,533,518 B2
(45) Date of Patent: Dec. 20, 2022

(54) AUDIO CUSTOMIZATION IN STREAMING ENVIRONMENT

(71) Applicant: International Business Machines Corporation, Armonk, NY (US)

(72) Inventors: Ching-Chun Liu, Taipei (TW); Ting-Chieh Yu, Taipei (TW); Yu-Siang Chen, Minxiong Township (TW); Ryan Young, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/032,558

(22) Filed: Sep. 25, 2020

(65) Prior Publication Data

US 2022/0103872 A1 Mar. 31, 2022

(51) Int. Cl.
*H04N 21/466* (2011.01)
*H04N 21/233* (2011.01)
*H04N 21/2187* (2011.01)
*H04N 21/845* (2011.01)
*H04N 21/4788* (2011.01)
(Continued)

(52) U.S. Cl.
CPC ..... *H04N 21/2335* (2013.01); *H04N 21/2187* (2013.01); *H04N 21/24* (2013.01); *H04N 21/4398* (2013.01); *H04N 21/4662* (2013.01); *H04N 21/4788* (2013.01); *H04N 21/8456* (2013.01)

(58) Field of Classification Search
None
See application file for complete search history.

(56) References Cited

U.S. PATENT DOCUMENTS 8,775,341 B1 * 7/2014 Commons ............... G10L 15/16
706/20
10,290,027 B2 5/2019 Bharath et al.
(Continued)

FOREIGN PATENT DOCUMENTS

WO WO-2007141052 A1 * 12/2007 ........ H04M 1/72448
WO 2019194742 A1 10/2019

OTHER PUBLICATIONS

Ali S. et al., "Live Audience Engagement System", IP.com No. IPCOM000251356D, 12 pages, Oct. 30, 2017.
(Continued)

*Primary Examiner* — William J Kim
(74) *Attorney, Agent, or Firm* — Eric Chesley

(57) ABSTRACT

A live stream, that includes a video stream and an audio stream, of a presenter is monitored. The live stream is attended by an audience that includes one or more audience members. One or more stream content features of the live stream at a first window of time is transmitted to a multimodal machine learning model. One or more audience content features of the audience at the first window of time is transferred to the multimodal model. One or more feature results, based on the stream content features and based on the audience content features, of the first window of time is obtained from the multimodal model. The feature results are sent to an auditory machine learning model. A first audio signal from the auditory machine learning model is received. An augmented stream of the first window of time is generated based on the first audio signal.

17 Claims, 6 Drawing Sheets

(51) Int. Cl.
  *H04N 21/439* (2011.01)
  *H04N 21/24* (2011.01)

(56) References Cited

U.S. PATENT DOCUMENTS

| | | | | |
|---|---|---|---|---|
| 2002/0143978 | A1* | 10/2002 | Kuramochi | H04N 21/8153 709/231 |
| 2003/0118974 | A1* | 6/2003 | Obrador | G09B 23/28 434/236 |
| 2009/0228796 | A1* | 9/2009 | Eggink | H04N 21/6582 715/866 |
| 2012/0310750 | A1 | 12/2012 | Schutzbank et al. | |
| 2013/0310750 | A1 | 11/2013 | Hopman et al. | |
| 2014/0136195 | A1* | 5/2014 | Abdossalami | H04M 3/2236 704/235 |
| 2015/0046267 | A1 | 2/2015 | MacTiernan et al. | |
| 2015/0169747 | A1* | 6/2015 | Hume | G06F 16/5866 704/8 |
| 2015/0264296 | A1* | 9/2015 | Devaux | H04N 9/8205 386/226 |
| 2015/0289023 | A1* | 10/2015 | Richman | H04N 21/25 725/32 |
| 2018/0035938 | A1 | 2/2018 | el Kaliouby et al. | |
| 2018/0145934 | A1* | 5/2018 | Pappu | H04L 51/02 |
| 2018/0189030 | A1* | 7/2018 | Thaker | G06F 16/951 |
| 2018/0374462 | A1* | 12/2018 | Steinwedel | G10H 1/366 |
| 2019/0012599 | A1* | 1/2019 | el Kaliouby | G06N 3/084 |
| 2019/0207992 | A1* | 7/2019 | Systrom | H04L 51/10 |
| 2019/0394507 | A1* | 12/2019 | Hardee | H04N 21/2187 |

OTHER PUBLICATIONS

Mell, P. et al., "The NIST Definition of Cloud Computing", Recommendations of the National Institute of Standards and Technology, NIST Special Publication 800-145, 7 pages, Sep. 2011.

* cited by examiner

AUDIO CUSTOMIZATION IN STREAMING ENVIRONMENT

BACKGROUND

The present disclosure relates to streaming of media, and more specifically, to an environment of providing an augmented version of a live stream to a plurality of audience members.

Streaming is becoming a more useful mechanism for permitting people to receive content provided by a presenter. Streaming may be used to provide entertainment, such as to allow audience members to consume an entertaining stream of audio-visual content, such as movies, music, and performances. Streaming may be used to provide education to one or more audience members to consume an educational stream of audio-visual content, such as a seminar or presentation. Streams may be a relatively static and homogenous content.

SUMMARY

According to embodiments, disclosed are a method, system, and computer program product. A live stream, that includes a video stream and an audio stream, of a presenter is monitored. The live stream is attended by an audience that includes one or more audience members. One or more stream content features of the live stream at a first window of time is transmitted to a multimodal machine learning model. One or more audience content features of the audience at the first window of time is transferred to the multimodal machine learning model. One or more feature results of the first window of time is obtained from the multimodal machine learning model. The feature results are based on the stream content features and based on the audience content features. The feature results of the first window of time are sent to an auditory machine learning model. A first audio signal from the auditory machine learning model is received. An augmented stream of the first window of time is generated based on the first audio signal.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
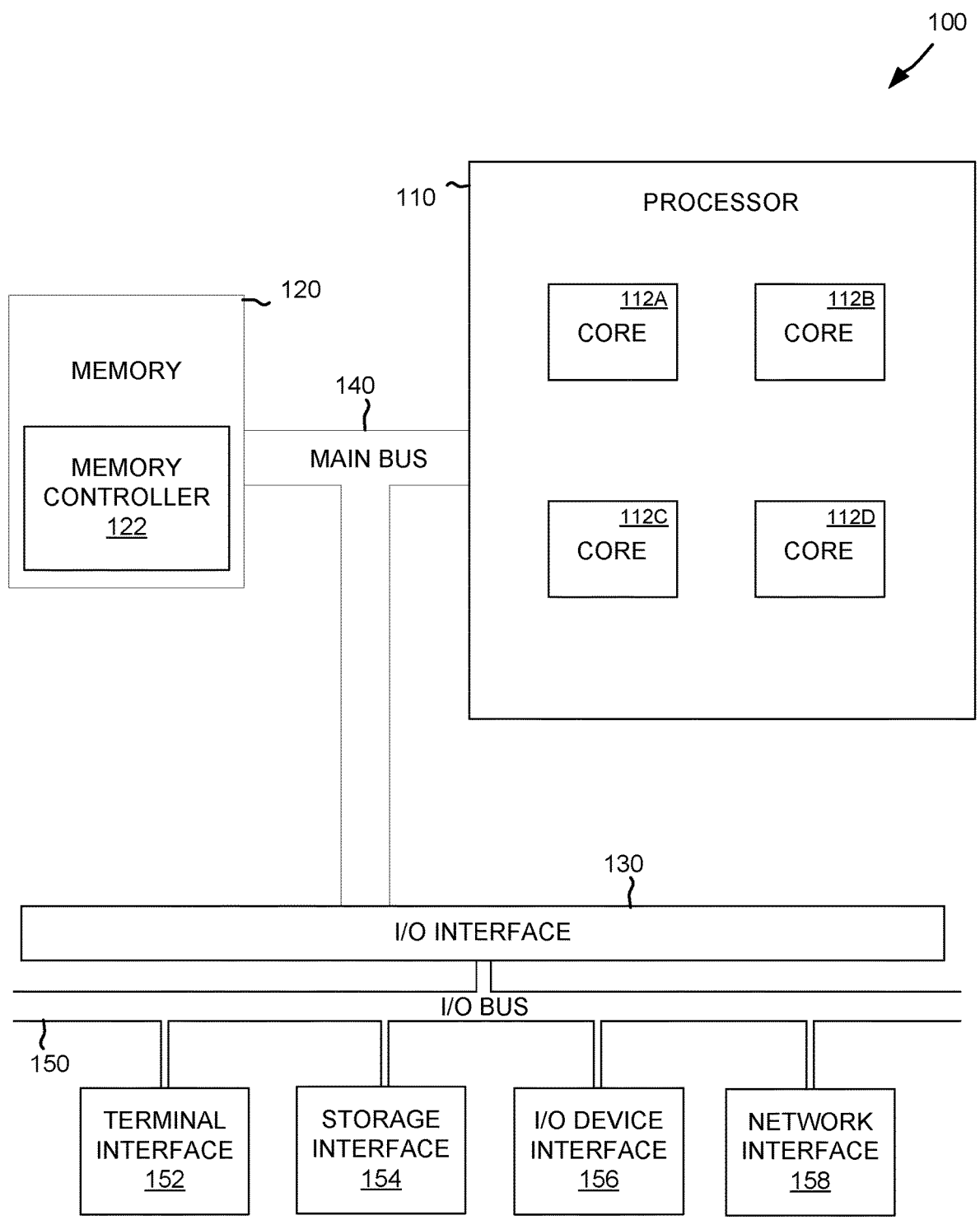
FIG. 1 depicts the representative major components of an example computer system that may be used, in accordance with some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to streaming of media, more particular aspects relate to an environment of providing an augmented version of a live stream to a plurality of audience members. While the present disclosure is not necessarily limited to such applications, various aspects of the disclosure may be appreciated through a discussion of various examples using this context.

Streaming is becoming a more useful mechanism for permitting people to receive content provided by a presenter. Streaming may be used to provide entertainment, such as to allow audience members to consume an entertaining stream of audio-visual content, such as movies, music, and performances. Streaming may be used to provide education to one or more audience members to consume an educational stream of audio-visual content, such as a seminar or presentation.

Streams may be provided from a presenter device to an audience for consumption, viewing, listening, and the like. The stream may be pre-recorded or may be a live audio-visual file broadcast to the audience across a network (e.g., the Internet). The stream may include an audio stream and a video stream that are an audio and video recording, respectively, of the presenter. An audience may include one or more audience members each operating from a client device.

Streaming may lead to certain drawbacks for both the presenter and audience member. One drawback is that streams may be a relatively static and homogenous content. The presenter may attempt to increase the interaction with the stream and with potential audience members. One possible way that a presenter can increase the reach and approval of the audience members is to generate a more dynamic or real-time stream, such as a live stream. The live stream may permit the presenter with the ability to interact with the one or more audience members. In detail, the presenter may be tasked with providing a stream of multimedia that includes a plurality of audiovisual content, in the form of the audio stream and the video stream. Further, the presenter may also attempt to facilitate interaction with the audience members to enrich and increase the quality of the live stream. For example, a presenter may be providing an educational seminar to a group of individuals regarding how to perform a practical solution to a problem, such as how to perform maintenance on a household appliance. At the same time, the audience members may be engaged with the live stream. For instance, the audience members may be connected through client devices that facilitate input by the audience, such as a keyboard or smartphone input of a computer or smartphone, respectively.

The live stream may lead to further issues. Specifically, a presenter may be focused on providing a conducive environment for learning or engagement with the audience. For example, the presenter may select certain lighting, setting, sounds, background music, and the like for the audience. For example, as the presenter explains how to fix a malfunctioning appliance, the presenter may attempt to make the presentation more cohesive by providing music in the background, such as study or concentration music. The setup of the environment for the live stream may consume significant time for the presenter. As such, the presenter may not be able to focus on presenting the material and providing the content in a cogent and consistent manner.

Another issue that may cause the presenter difficulty in providing a live stream is keeping up with the audience. Specifically, the audience members may be asking questions and making comments to the presenter. The presenter may be forced to choose how to spend time during the live stream. For example, it might increase the engagement and help with learning if the presenter inserted proper sounds and music, such as sound effects responsive to certain comments and questions. In another example, a presenter may choose to increase cohesion for the presentation if they spend time answering and responding to questions provided by the audience members. In yet another example, if a presenter spends time trying to increase the engagement of the presentation, they may waste time that could be used to provide more detailed instruction or present additional relevant topics to the audience.

A user may be able to provide increased audience engagement by attempting to prerecord the stream. For example, a presenter may attempt to create a presentation regarding features of an upcoming software release. The presenter may choose to forgo presenting the stream in real time. Specifically, the presenter may choose to generate a pre-recorded version of the stream. The presenter may perform research regarding the potential audience of the stream. The presenter may use one or more tools, such as research or statistical analysis to attempt to determine, the type of audience members that are likely to view the content. Based on statistical results, the presenter may determine that an age range of the audience is likely to be adults between the ages of 28-55 years old. The presenter may perform additional research and may then select certain views, scenes, sound effects, music, and the like that are timed to certain events in the pre-recorded stream. The presenter may determine that the software is engaging for users because it works on existing desktop computers that are a primary focus of the 25-55 age group. After incorporating relevant views, scenes, sound effects, and music that is timed to the portion of the pre-recorded stream, that is related to the software compatibility, the presenter publishes the stream on a public forum (e.g., a streaming website) for consumption. The presentation, however, is not targeted at the 15-25-year-old demographic, because the scenes, sound effects, and music is not focused on new features that are of interest to the 15-25 age group. As the presentation is supposed to be educational and engaging for multiple age groups, the presenter must generate additional versions of the pre-recorded stream. Consequently, the presenter cannot also participate in the stream to answer questions of the 28-55 age group version of the stream, and the 15-25 age group version of the stream.

Real-time live-stream augmentation (RLA) may provide advantageous over other forms of live streaming. Specifically, RLA may include a system, method, and computer program product of generating multiple augmented forms of a live stream. The RLA may improve the quality of a live stream (stream). For example, the RLA may monitor the stream of the presenter including the audio stream and video stream of the presenter. The RLA may performing modification and adjustment of the audio stream. The augmented stream may include generated sound effects, and inserted music. The augmented stream may be performed based on the content of the presenter. The augmented stream may be performed based on the content of the audience.

The RLA may perform one or more machine learning (ML) techniques on the stream. For example, the RLA may operate by transmitting one or more stream content features, such as the audio stream of the stream, the speech of the presenter of the stream, and the video stream of the stream, to a multimodal model. The multimodal model may include a plurality of modules configured to perform preprocessing, feature extraction and ML techniques. The multimodal model may also perform techniques to identify audience features that are received from an audience of multiple audience members. The RLA may generate from the multimodal model one or more content features of the live stream. The RLA may generate a plurality of content features for each instance of the live stream that exists. For example, a live stream may be viewed by 1500 distinct audience members at a similar time. The multimodal model may be configured to receive each of the audience content features of the 1500 audience members. The multimodal model may be configured to further generate the content features for each audience member of the audience.

The RLA may operate by sending the generated features to an audio model. The audio model may be a second machine-learning model that is configured to receive content features, such as descriptors of the audio. The audio model may be configured to receive as input two things: first, the output of the multimodal model; and second, a copy of the original audio stream of the live stream. The RLA may operate by obtaining from the multimodal model the output and sending that output to the audio model. Responsively, the audio model may be configured to perform one or more ML techniques on the features and provide to the RLA an audio signal (e.g., a sound effect, a music clip, a plurality of sound effects, a combination of one or more sound effects and a music clip). The RLA may, based on the received audio signal generate an augmented stream. The augmented stream may include the original audio stream and the received audio signal. For example, if a stream includes background music originally, and after processing by the RLA, the stream may further include a generated noise from the audio model. In some embodiments, the augmented stream may include replaced audio. For example, a live stream may include original music that conveys a "happy" theme, and based on the operations of the RLA, the audio stream of the stream may have removed the original music and insert silence to convey a "serious" theme.

The RLA may provide one or more features or advantages over other techniques to generate a live stream. A first advantage may be the ability to increase the quality of the stream. For example, as live streams may include an audience of thousands or more, each audience member may have different interests, attention spans, or engagement styles. The RLA may generate a unique augmented stream with customized audio for each audience member. This may lead to increased engagement. Second the RLA may operate on a live stream as the stream is currently being broadcast from a presenter with limited computing resources. Practically speaking, a presenter may be providing a live stream of an outdoor environment on smartphone, or other portable computing device with limited processing and memory resources. The RLA may operate on a separate computing device to intercept the live stream before it is passed to each of the audience members. The RLA may generate as the presenter is presenting the live stream each augmented stream for each audience member. As the streaming device only has limited memory, the RLA may perform the computations without slowing down the streaming device or using significant memory and CPU resources of the streaming device.

Third, the RLA may reduce the overall size of content for a network provider or content hosting provider (providers) of the stream. For example, a presenter may (without the aid of the RLA) generate a plurality of live streams, one for each audience segment (e.g., group of people interested in pop music, age demographic, etc.). Specifically, a presenter may coordinate with a content production team to generate a plurality of live streams. The content production team may include producers and writers may use multiple computing devices to generate a plurality of live streams, each with different tones, music, sounds, and audio signals for each audience segment. While it may be technically impossible to generate an individual stream for each audience member of an audience in the thousands, the content production team and the presenter may be able to generate three, four, or even a dozen different versions of a live stream. The network bandwidth to provide multiple streams from the location where the live streams is created to be distributed to each of the audience members may be significant (e.g., hundreds or thousands of megabits of upload bandwidth). Leveraging the RLA, only a single original stream may be created by the presenter on a single computing device, and the additional augmented streams may be generated by the RLA. This may significantly reduce the bandwidth of the network needed by the presenter. The generated augmented streams of the RLA may also save on storage costs. For example, the size of a multiple streams while stored on a provider network may consume many gigabytes of data, which may reduce the availability of the provider to store additional different versions, whereas the RLA may operate on a live stream as it is provided without storing any different versions. In some embodiments, the RLA may operate on a live stream without storing any version of the stream in a long-term storage.

Fourth, the RLA may operate in an ad-hoc manner at time-of-access and without the need to store additional content. The ML techniques and processing powers can be allocated to audience members at the time a stream is to be viewed by a given audience member. Before an audience member decides to view the stream, only a single copy of the stream may need to be stored on a provider server. At the time of viewing, the ML techniques of the RLA may generate the customized version (e.g., the augmented stream) for the particular audience member. The RLA techniques, may consequently reduce the storage costs compared to storing multiple versions of the stream for consumption.

Fifth, an RLA may be scalable on a granular level. For example, a presenter and a content production team may over- or under-estimate the number of different versions of a stream that may need creation before a live stream is scheduled to go live. Specifically, a presenter and content production team may generate five versions of a particular stream in anticipation of five distinct audience segments being in attendance or otherwise viewing the stream. Later, only three distinct versions of the stream may be consumed by only three distinct audience segments that are interested in consuming content of the presenter. Practically speaking, the earlier creation of five streams constitutes a wasting of storage spaced and processing cycles on creating unused versions. Using the RLA, only the augmented streams that are actually to be consumed by a given audience member are generated by the multimodal and audio models.

FIG. 1 depicts the representative major components of an example computer system 100 (alternatively, computer) that may be used, in accordance with some embodiments of the present disclosure. It is appreciated that individual components may vary in complexity, number, type, and/or configuration. The particular examples disclosed are for example purposes only and are not necessarily the only such variations. The computer system 100 may include a processor 110, memory 120, an input/output interface (herein I/O or I/O interface) 130, and a main bus 140. The main bus 140 may provide communication pathways for the other components of the computer system 100. In some embodiments, the main bus 140 may connect to other components such as a specialized digital signal processor (not depicted).

The processor 110 of the computer system 100 may be comprised of one or more cores 112A, 112B, 112C, 112D (collectively 112). The processor 110 may additionally include one or more memory buffers or caches (not depicted) that provide temporary storage of instructions and data for the cores 112. The cores 112 may perform instructions on input provided from the caches or from the memory 120 and output the result to caches or the memory. The cores 112 may be comprised of one or more circuits configured to perform one or more methods consistent with embodiments of the present disclosure. In some embodiments, the computer system 100 may contain multiple processors 110. In some embodiments, the computer system 100 may be a single processor 110 with a singular core 112.

The memory 120 of the computer system 100 may include a memory controller 122. In some embodiments, the memory 120 may include a random-access semiconductor memory, storage device, or storage medium (either volatile or non-volatile) for storing data and programs. In some embodiments, the memory may be in the form of modules (e.g., dual in-line memory modules). The memory controller 122 may communicate with the processor 110, facilitating storage and retrieval of information in the memory 120. The memory controller 122 may communicate with the I/O interface 130, facilitating storage and retrieval of input or output in the memory 120.

The I/O interface 130 may include an I/O bus 150, a terminal interface 152, a storage interface 154, an I/O device interface 156, and a network interface 158. The I/O interface 130 may connect the main bus 140 to the I/O bus 150. The I/O interface 130 may direct instructions and data from the processor 110 and memory 120 to the various interfaces of the I/O bus 150. The I/O interface 130 may also direct instructions and data from the various interfaces of the I/O bus 150 to the processor 110 and memory 120. The various interfaces may include the terminal interface 152, the storage interface 154, the I/O device interface 156, and the network interface 158. In some embodiments, the various interfaces may include a subset of the aforementioned interfaces (e.g., an embedded computer system in an industrial application may not include the terminal interface 152 and the storage interface 154).

Logic modules throughout the computer system 100—including but not limited to the memory 120, the processor 110, and the I/O interface 130—may communicate failures and changes to one or more components to a hypervisor or operating system (not depicted). The hypervisor or the operating system may allocate the various resources available in the computer system 100 and track the location of data in memory 120 and of processes assigned to various cores 112. In embodiments that combine or rearrange elements, aspects and capabilities of the logic modules may be combined or redistributed. These variations would be apparent to one skilled in the art.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
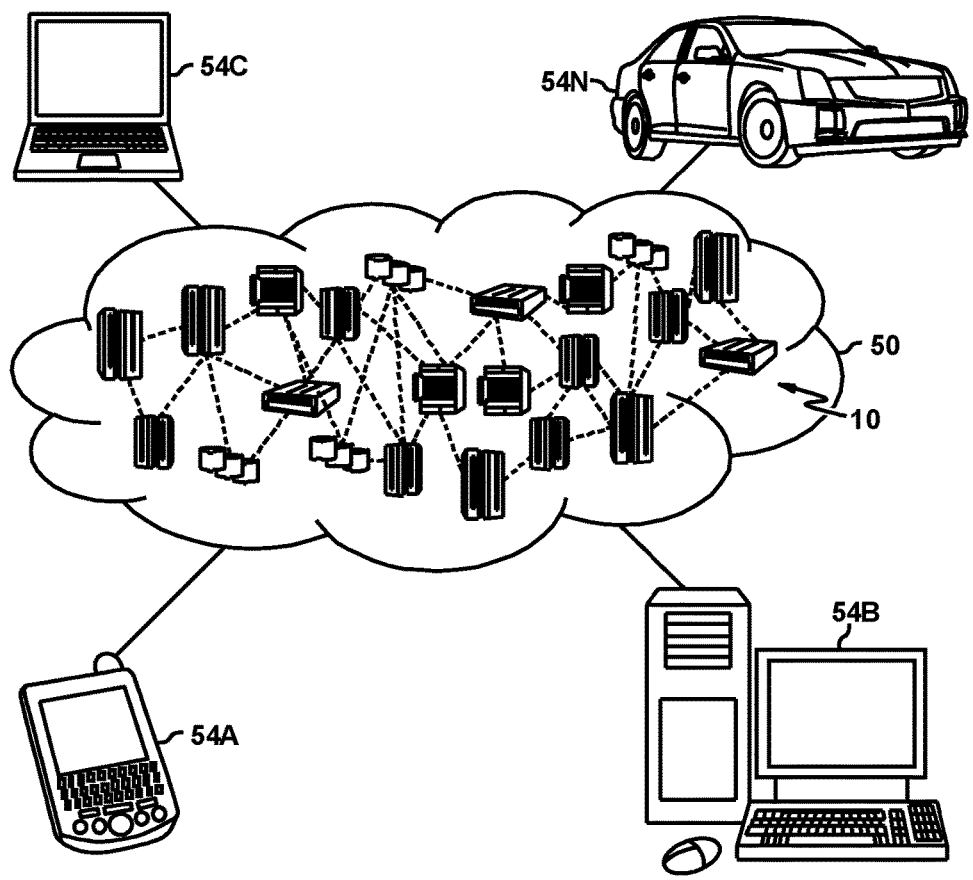
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
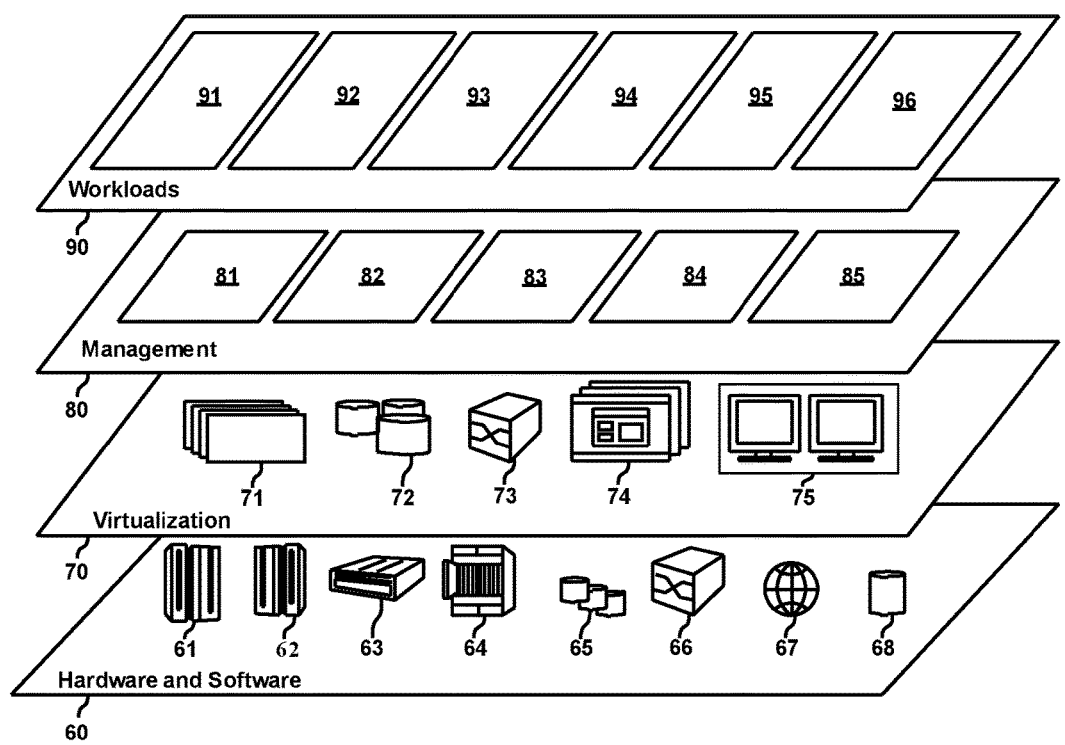
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and RLA 96.

Figure 4:
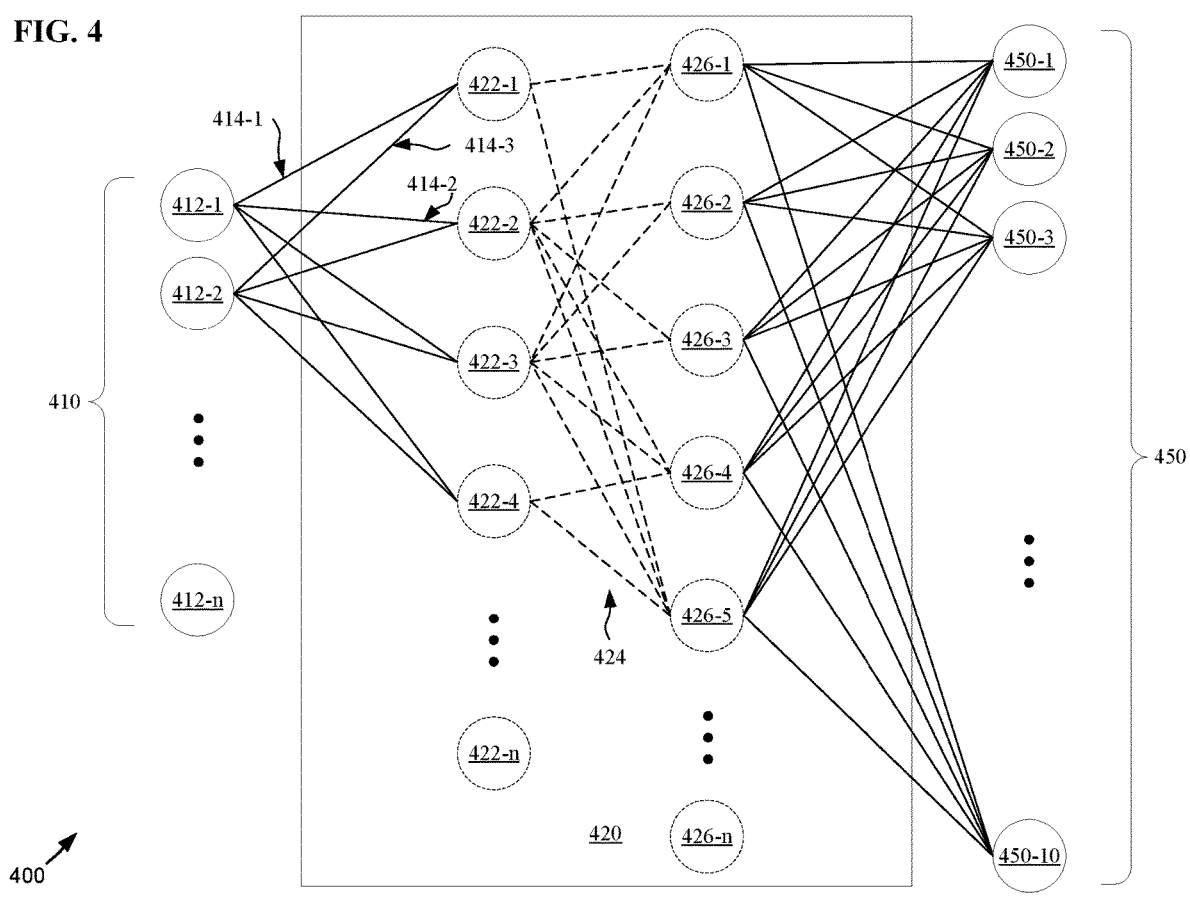
FIG. 4 depicts a model representative of one or more artificial neural networks capable of generating augmented streams consistent with embodiments of the present disclosure.

FIG. 4 depicts a model 400 representative of one or more artificial neural networks capable of generating augmented streams consistent with embodiments of the present disclosure. The model neural network (neural network) 400 is made up of a plurality of layers. The neural network 400 includes an input layer 410, a hidden section 420, and an output layer 450. Though model 400 depicts a feed-forward neural network, it should be appreciated that other neural networks layouts may also be contemplated to perform RLA such as a recurrent neural network layout (not depicted). In some embodiments, the neural network 400 may be a design-and-run neural network and the layout depicted by the model may be created by a computer programmer. In some embodiments, the neural network 400 may be a design-by-run neural network and the layout depicted may be generated by the input of data and by the process of analyzing that data according to one or more defined heuristics. The neural network 400 may operate in a forward propagation by receiving an input and outputting a result of the input. The neural network 400 may adjust the values of various components of the neural network by a backward propagation (back propagation).

The input layer 410 includes a series of input neurons 412-1, 412-2, up to 412-*n* (collectively, 412) and a series of input connections 414-1, 414-2, 414-3, 414-4, etc. (collectively, 414). The input layer 410 represents the input from data that the neural network is supposed to analyze (e.g., a video stream of a presenter, an audio stream of a presenter, speech of a presenter, a textual input from an audience member, a digitized picture from an audience member, such as an animated GIF or an emoticon). Each input neuron 412 may represent a subset of the input data. For example, the neural network 400 is provided with a video stream of a live stream as input, and the video stream is represented by a series of pixels. In this example, input neuron 412-1 may be the first pixel of the picture, input neuron 412-2 may be the second pixel of the picture, etc. The number of input neurons 412 may correspond to the size of the input. For example, when the neural network is designed to analyze images that are 256 pixels by 256 pixels, the neural network 400 layout may include a series of 65,536 input neurons. The number of input neurons 412 may correspond to the type of input. For example when the input is a color image that is 256 pixels by 256 pixels, the neural network 400 layout may include a series of 196,608 input neurons (65,536 input neurons for the red values of each pixel, 65,536 input neurons for the green values of each pixel, and 65,536 input neurons for the blue values of each pixel). The type of input neurons 412 may correspond to the type of input. In a first example, the neural network 400 may be designed to analyze images that are black and white, and each of the input neurons may be a decimal value between 0.00001 and 1 representing the grayscale shades of the pixel (where 0.00001 represents a pixel that is completely white and where 1 represents a pixel that is completely black). In a second example, the neural network 400 may be designed to analyze images that are color, and each of the input neurons may be a three dimensional vector to represent the color values of a given pixel of the input images (where the first component of the vector is an red whole-number value between 0 and 255, the second component of the vector is an green whole-number value between 0 and 255, and the third component of the vector is an red whole-number value between 0 and 255).

The input connections 414 represents the output of the input neurons 412 to the hidden section 420. Each of the input connections 414 vary depending on the value of each input neuron 412 and based upon a plurality of weights (not depicted). For example, the first input connection 414-1 has a value that is provided to the hidden section 420 based on the input neuron 412-1 and a first weight. Continuing the example, the second input connection 414-2 has a value that is provided to the hidden section 420 based on the input neuron 412-1 and a second weight. Further continuing the example, the third input connection 414-3 based on the input neuron 412-2 and a third weight, etc. Alternatively stated, the input connections 414-1 and 414-2 share the same output component of input neuron 412-1 and the input connections 414-3 and 414-4 share the same output component of input neuron 412-2; all four input connections 414-1, 414-2, 414-3, and 414-4 may have output components of four different weights. Though the neural network 400 may have different weightings for each connection 414, some embodiments may contemplate weights that are similar. In some embodiments, each of the values of the input neurons 412 and the connections 414 may necessarily be stored in memory.

The hidden section 420 includes one or more layers that receive inputs and produce outputs. The hidden section 120 includes a first hidden layer of calculation neurons 422-1, 422-2, 422-3, 422-4, up to 422-*n* (collectively, 422); a second hidden layer of calculation neurons 426-1, 426-2, 426-3, 426-4, 426-5, up to 426-*n* (collectively 426); and a series of hidden connections 424 coupling the first hidden layer and the second hidden layer. It should be appreciated that model 400 only depicts one of many neural networks capable of performing operations of a multimodal model or audio model consistent with some embodiments of the disclosure. Consequently, the hidden section 420 may be configured with more or less hidden layers (e.g., one hidden layer, seven hidden layers, twelve hidden layers, etc.)—two hidden layers are depicted for example purposes.

The first hidden layer 422 includes the calculation neurons 422-1, 422-2, 422-3, 422-4, up to 422-n. Each calculation neuron of the first hidden layer 422 may receive as input one or more of the connections 414. For example, calculation neuron 422-1 receives input connection 414-1 and input connection 414-2. Each calculation neuron of the first hidden layer 422 also provides an output. The output is represented by the dotted lines of hidden connections 424 flowing out of the first hidden layer 422. Each of the calculation neurons 422 performs an activation function during forward propagation. In some embodiments, the activation function may be a process of receiving several binary inputs, and calculating a single binary output (e.g., a perceptron). In some embodiments, the activation function may be a process of receiving several non-binary inputs (e.g., a number between 0 and 1, 0.671, etc.) and calculating a single non-binary output (e.g., a number between 0 and 1, a number between −0.5 and 0.5, etc.). Various functions may be performed to calculate the activation function (e.g., a sigmoid neurons or other logistic functions, tanh neurons, softplus functions, softmax functions, rectified linear units, etc.). In some embodiments, each of the calculation neurons 422 also contains a bias (not depicted). The bias may be used to decide the likelihood or valuation of a given activation function. In some embodiments, each of the values of the biases for each of the calculation neurons must necessarily be stored in memory.

An example of model 400 may include the use of a sigmoid neuron for the activation function of calculation neuron 422-1. An equation (Equation 1, stated below) may represent the activation function of calculation neuron 412-1 as f(neuron). The logic of calculation neuron 422-1 may be the summation of each of the input connections that feed into calculation neuron 422-1 (i.e., input connection 414-1 and input connection 414-3) which are represented in Equation 1 as j. For each j the weight w is multiplied by the value x of the given connected input neuron 412. The bias of the calculation neuron 422-1 is represented as b. Once each input connection j is summed the bias b is subtracted. Finalizing the operations of this example as follows: given a larger positive number results from the summation and bias in activation f(neuron), the output of calculation neuron 422-1 approaches approximately 1; given a larger negative number results from the summation and bias in activation f(neuron), the output of calculation neuron 422-1 approaches approximately 0; and given a number somewhere in between a larger positive number and a larger negative results from the summation and bias in activation f(neuron), the output varies slightly as the weights and biases vary slightly.

$$f(\text{neuron}) = \frac{1}{1 + \exp(-\Sigma_j \, w_j x_j - b)} \quad \text{Equation 1}$$

The second hidden layer 426 includes the calculation neurons 426-1, 426-2, 426-3, 426-4, 426-5, up to 426-n. In some embodiments, the calculation neurons of the second hidden layer 426 may operate similarly to the calculation neurons first hidden layer 422. For example, the calculation neurons 426-1 to 426-n may each operate with a similar activation function as the calculation neurons 422-1 to 422-n. In some embodiments, the calculation neurons of the second hidden layer 426 may operate differently to the calculation neurons of the first hidden layer 422. For example, the calculation neurons 426-1 to 426-n may have a first activation function, and the calculation neurons 422-1 to 422-n may have a second activation function.

Likewise the connectivity to, from, and between the various layers of the hidden section 420 may also vary. For example, the input connections 414 may be fully connected to the first hidden layer 422 and hidden connections 424 may be fully connected from the first hidden layer to the second hidden layer 426. In embodiments, fully connected may mean that each neuron of a given layer may be connected to all the neurons of a previous layer. In embodiments, fully connect may mean that each of neuron of a given layer may function completely independently and do not share any connections. In a second example, the input connections 414 may not be fully connected to the first hidden layer 422 and the hidden connections 424 may not be fully connected from the first hidden layer to the second hidden layer 426.

Also likewise the parameters to, from, and between the various layers of the hidden section 420 may also vary. In some embodiments, the parameters may include the weights and the biases. In some embodiments, there may be more or less parameters than the weights and biases. For example, the model 400 may be of a convolutional network. The convolutional neural network may include a sequence of heterogeneous layers (e.g., an input layer 410, a convolution layer 422, a pooling layer 426, and an output layer 450). In such a network, the input layer may hold the raw pixel data of an image in a 3-dimensional volume of width, height, and color. The convolutional layer of such a network may output from connections that are only local to the input layer to identify a feature in a small section of the image (e.g., an eyebrow from a face of a first subject in a picture depicting four subjects, a front fender of a vehicle in a picture depicting a truck, etc.). Given this example, the convolutional layer may include weights and biases, as well as, additional parameters (e.g., depth, stride, and padding). The pooling layers of such a network may take as input the output of the convolutional layers but perform a fixed function operation (e.g., an operation that does not take into account any weight or bias). Also given this example, the pooling layer may not contain any convolutional parameters and may also not contain any weights or biases (e.g., performing a down-sampling operation).

The output layer 450 includes a series of output neurons 450-1, 450-2, 450-3, up-to 450-n (collectively, 450). The output layer 450 holds a result of the analyzation of the neural network 400. In some embodiments, the output layer 450 may be a categorization layer used to identify a feature of the input to the neural network 400. For example, the neural network 400 may be a classification network trained to identify Arabic numerals. In such an example, the neural network 400 may include ten output neurons 450 corresponding to which Arabic numeral the network has identified (e.g., output neuron 450-2 having a higher activation value than output neurons 450 may indicate the neural network determined an image contained the number '1'). In some embodiments, the output layer 450 may be a real-value target (e.g., trying to predict a result when an input is a previous set of results) and there may be only a singular output neuron (not depicted). The output layer 450 is fed from an output connection 452. The output connection 452 provides the activations from the hidden section 420. In some embodiments, the output connections 452 may include weights and the output neurons 450 may include biases.

Training the neural network depicted by the model 400 may include performing back propagation. Back propagation is different from forward propagation. Forward propagation may include feeding of data into the input neurons 410; performing the calculations of the connections 414, 424, 452; and performing the calculations of the calculation neurons 422 and 426. The forward propagation may also be the layout of a given neural network (e.g., recurrence, number of layers, number neurons in one or more layers, layers being fully connected or not to other layers, etc.). Back propagation may be determining an error of the parameters (e.g., the weights and the biases) in the neural network 400 by starting with the output neurons 450 and propagating the error backward through the various connections 452, 424, 414 and layers 426, 422, respectively.

Back propagation includes performing one or more algorithms based on one or more training data to reduce the difference between what a given neural network determines from an input and what the given neural network should determine from the input. The difference between a network determination and the correct determination may be called the objective function (alternatively, the cost function). When a given neural network is initially created and data is provided and calculated through a forward propagation the result or determination may be an incorrect determination.

For example, the multimodal model of the RLA may be a first example network 400. For training, the first example network 400 may be provided with a first input training data set that is a pre-generated streaming data that also include metadata that describes the content. The pre-generated streaming data may include a plurality of inputs including the following: first input that contains speech from presenters of video streams, second input that contains sounds effects from video streams, third input that contains visual images representative of frames of video streams. The first example network 400 may output a series of features that correspond to a generated inference of the type of stream. Specifically, a classification of "happy", "sad", "serious", "playful", and the like may be one or more of the outputs. Through back propagation, values of the output and of the weights and values of the connections 414, 424, and 452, may be altered to match labeling that is provided in metadata of the pre-generated streaming data. In some embodiments, additional training data may be provided. For example, training data may include pre-generated audience data that includes a plurality of inputs including the following: first input that contains text messages from audience members, and a second input that includes graphical messages from audience members. The pre-generated audience data may also include metadata that describes the content. The first example network 400 may be trained by updating the network. Specifically, performing a back propagation may alter the values of the weights of connections 414, 424, and 452; and may alter the values of the biases of the first layer of calculation neurons 422, the second layer of calculation neurons 426, and the output neurons 450. Further continuing the example, the performance of the back propagation may yield a future result that is a more accurate classification of the same input. The more accurate classification may output content features that correctly identify the example pre-generated streaming data. For example, content features may accurately identify the following of a presenter: first features such as tone, voice, wording of sound; second features such as lexical, syntactic, and semantic features of speech, third features of eye, mouth, eyebrow of visual streams. In another example, content features may accurately identify the following of an audience member: a first feature such as lexical, syntactic, and semantic, of a text message of an audience member; a second feature such as happy, sad, angry imagery of a visual message of an audience member.

In a second example, the audio model of the RLA may be a second example network 400. For training, the second example network 400 may be provided with a second input training data set that includes one or more pre-generated content features that also includes metadata that describes the pre-generated content. The second input training data set data may include a plurality of inputs including the following: first input that contains content features of a live stream including a presenter and audience members, such as happy, sad, fun, excited, etc.; a second input that contains corresponding control tone, rhythm, volume and other features of appropriate sounds, classification, media, genre, and other features of appropriate music, a third input that contains corresponding identification of associated appropriate content features. The second example network 400 may output audio signals that correspond to the ML techniques of the input of the second training data set. Specifically, sound effects and/or music that is associated with happy, sad, fun, serious, specific genres of music, or specific referential sound effects. Through back propagation, values of the output and of the weights and values of the connections 414, 424, and 452, may be altered to match labeling that is provided in metadata of the second input training data set. Further continuing the example, the performance of the back propagation may yield a future result in second example network 400 that is a more accurate classification of the same input. The more accurate classification may output content features that correctly identify data in the second training data set—for example, an output of a more accurately matched music, or a more appropriate sound effect for the context.

Equation 2 provides an example of the objective function in the form of a quadratic cost function (e.g., mean squared error)—other functions may be selected and the mean squared error is selected for example purposes. In Equation 2, all of the weights w and biases b of an example network. The example network is provided a given number of training inputs n in a subset (or entirety) of training data that have input values x. The example network may yield output a from x and should yield a desired output y(x) from x. Back propagation or training of the example network should be a reduction or minimization of the objective function "O(w, b)" via alteration of the set of weights and biases. Successful training of the example network should not only include the reduction of the difference between the example network's answer a and the correct answers y(x) for the input values x, but given new input values (e.g., from additional training data, from validation data, etc.).

$$O(w, b) \equiv \frac{1}{2n} \Sigma_x \; \|y(x) - a\|^2 \qquad \text{Equation 2}$$

Many options may be utilized for back propagation algorithms in both the objective function (e.g., mean squared error, cross-entropy cost function, etc.) and the reduction of the objective function (e.g., gradient descent, batch-based stochastic gradient descent, Hessian optimization, momentum-based gradient descent, etc.). Back propagation may include using a gradient descent algorithm (e.g., computing partial derivatives of an objective function in relation to the weights and biases for all of the training data). Back propagation may include determining a stochastic gradient descent (e.g., computing partial derivatives of a subset the training inputs in a subset or batch of training data). Additional parameters may be involved in the various back propagation algorithms (e.g., the learning rate for the gradient descent). Large alterations of the weights and biases through back propagation may lead to incorrect training (e.g., overfitting to the training data, reducing towards a local minimum, reducing excessively past a global minimum, etc.). Consequently, modification to objective functions with more parameters may be used to prevent incorrect training (e.g., utilizing objective functions that incorporate regularization to prevent overfitting). Also consequently, the alteration of the neural network 400 may be small in any given iteration. Back propagation algorithms may need to be repeated many iterations to perform accurate learning as a result of the necessitated smallness of any given iteration.

For example, neural network 400 may have untrained weights and biases, and back propagation may involve the stochastic gradient descent to train the network over a subset of training inputs (e.g., a batch of ten training inputs from the entirety of the training inputs). Continuing the example, neural network 400 may continue to be trained with a second subset of training inputs (e.g., a second batch of ten training inputs from the entirety other than the first batch), which can be repeated until all of the training inputs have been used to calculate the gradient descent (e.g., one epoch of training data). Stated alternatively, if there are 10,000 training images in total, and one iteration of training uses a batch size of 100 training inputs, 1,000 iterations would be needed to complete an epoch of the training data. Many epochs may be performed to continue training of a neural network. There may be many factors that determine the selection of the additional parameters (e.g., larger batch sizes may cause improper training, smaller batch sizes may take too many training iterations, larger batch sizes may not fit into memory, smaller batch sizes may not take advantage of discrete GPU hardware efficiently, too little training epochs may not yield a fully trained network, too many training epochs may yield overfitting in a trained network, etc.).

Figure 5:
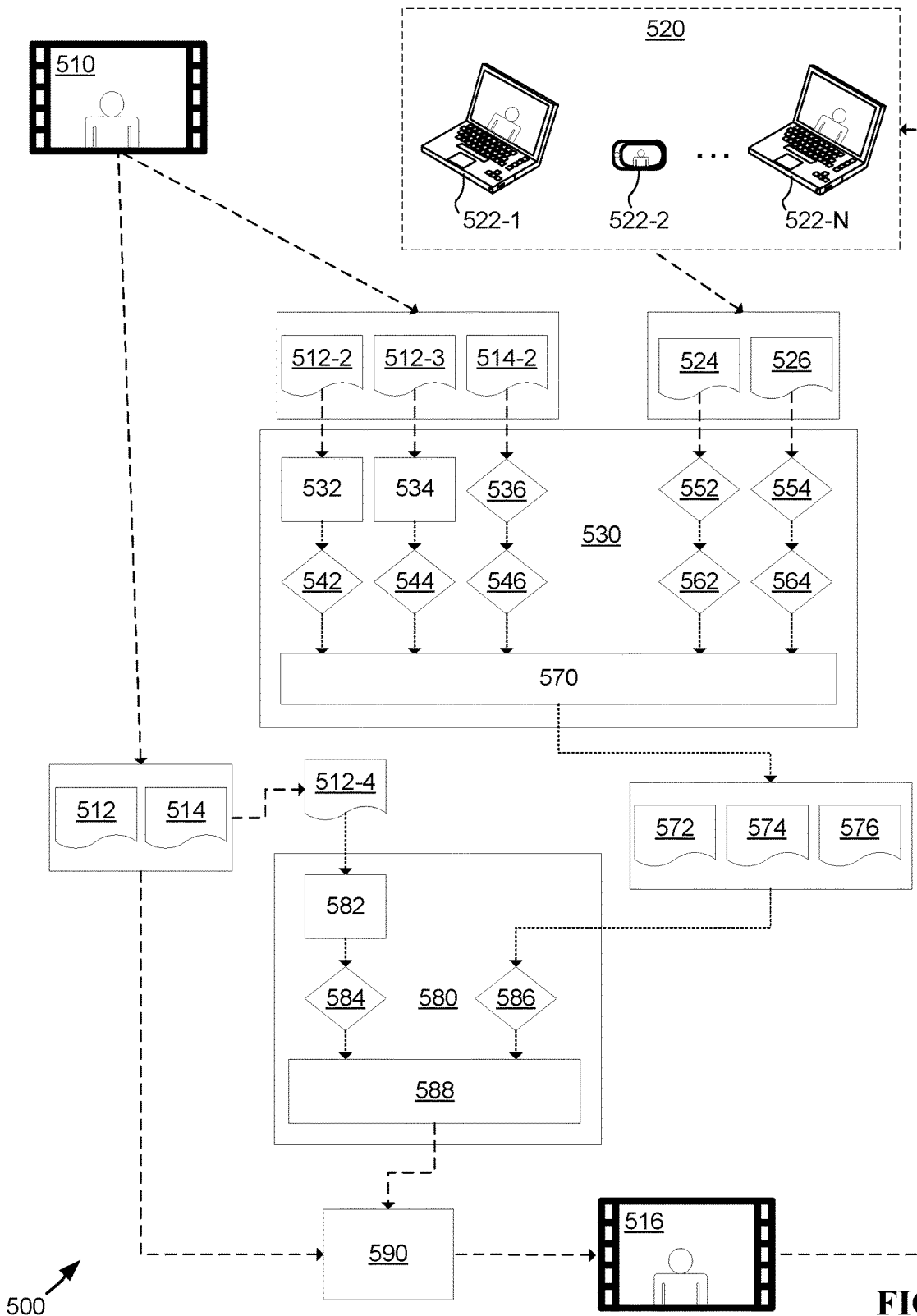
FIG. 5 depicts a system of performing augmented stream generation with a real-time live-stream augmentation (RLA), consistent with some embodiments of the disclosure.

FIG. 5 depicts a system 500 of performing augmented stream generation with an RLA, consistent with some embodiments of the disclosure. System 500 may operate on a computer system, such as computer 100. System 500 may be performed by a cloud computing service, such as cloud computing environment 50.

System 500 may include the following: a stream 510 of a presenter; an audience 520 of audience members; a multimodal model 530, an audio model 580; and a compositing engine 590. System 500 may be configured to output an augmented stream 516 of the presenter. The stream 510 may include an audio stream 512 and a video stream 514. The audience 520 may include a plurality of audience member client devices (client devices) 522-1, 522-2, up to 522-N (collectively, client devices 522). The client devices 522 may each be computing devices configured to receive input from a user and consume the stream 510. The client devices 522 may receive input such as text messages and graphical messages (e.g., emoticons, images, animated pictures). The text messages and graphical messages may be received from the audience members, and the client devices 522 may provide the text messages and the graphical messages to the stream 510.

The multimodal model 530 may include a collection of modules for performing one or more operations of RLA. Likewise, audio model 580 may include a collection of modules for performing one or more operations of RLA. In some embodiments, each module may be software, such as one or more algorithms, processes, and other software code configured to perform one or more operations of RLA. In some embodiments, each module may include general purpose computing hardware configured to perform one or more operations of RLA. In some embodiments, each module may include a combination of software and hardware configured to perform one or more operations of RLA. For example, an example module may include a plurality of software algorithms executing as a subroutine, task, daemon, or the like on a general-purpose processing unit of a computer system, such as computer 100. In some embodiments, each module may include special purpose hardware configured to perform operation of RLA. For example, an example module may include fixed function circuitry of a special purpose application specific integrated circuit.

The multimodal model 530 may take as input the live stream 510 and messages from one or more client devices 522. For example, a first instance of multimodal model 530 may receive as input the live stream 510 and text messages and graphical messages from a first client device 522-1. A second instance of multimodal model 530 may receive as input the live stream 510 and text messages and graphical messages from a second client device 522-2. Similarly, audio model 580 may receive as input the live stream 510 and the output of multimodal model 530 dependent upon an audience member. For example, a first instance of audio model 580 may receive as input output a content the following: first, features output from a first instance of multimodal regarding the live stream 510 and the text and graphical messages from a first client device 522-1; and second, live stream 510.

The multimodal model 530 may be configured to identify one or more content features based on the input. Specifically, each module may be modality configured, e.g., designed with respective to what signal input as well as what output form are expected. All the modalities are combined into a final prediction after processed by each respective module, including distinctive preprocessing and feature extraction. In order to interpret and reason about the characteristics in the live stream 510, the multimodal model 530 may implement features of neural networks, such as deep learning operation of instances of network 400. Based on the features of deep learning can be applied to transfer knowledge between multiple modalities (e.g., different characteristics of the input and generated inferences).

The multimodal model 530 may be configured to adopts a split architecture. In the split architecture, separate instances of a neural network (such as network 400) are configured for each modality. For instance, the architecture of multimodal model 530 may include the following: a first module 532 may be configured to process a first audio copy 512-2 of the audio stream 512; a second module 534 may be configured to process a second audio copy 512-3 of the audio stream 512; a third module 536 may be configured to process a first video copy 514-2 of the video stream 514. The first module 532, second module 534, and third module 536 may be configured to determine characteristics based on sensor-specific information from the live stream 510. In operation, the first module 532 may be configured to perform speech-to-text recognition on the first audio copy 512-2 of the presenter in the audio stream 512. For example, the first module 532 may perform a Fourier Transform, a Mel Frequency Cepstrum Coefficient, and a sound encoder. The second module 534 may be configured to perform sound processing of audio effects, tones, musical identification. For example, the second module 534 may perform a Fourier Transform, a Mel Frequency Cepstrum Coefficient, and an instance of neural network 400 configured as a convolution neural network. The third module 536 may be configured to perform video processing, such as an instance of neural network 400 as a convolution neural network. The neural network instance of the third module 536 may be configured to detect an analyze the visual data, such as images and motions of the presenter.

The resultant concepts (of processing the live stream 510) may be unified into a logically consistent set of concepts. Specifically, the learning and results of first module 532, second module 534, and 536 may be values of different types or ranges. The multimodal model 530 may perform additional processing to regularize, or otherwise bridge the modality differences into a series of like-valued variables. For example, the output of first module 532 may be provided to fourth module 542. The fourth module 542 may be configured as an instance of network 400 to perform long short-term memory (LSTM) operations of a recurrent network configuration. The output of the fourth module 542 may include presenter text features (e.g., features of the speech of the presenter in the audio stream 512). The output of the second module 534 may be provided to a fifth module 544. The fifth module 544 may be configured as an instance of network 400 to perform LSTM. The output of the fifth module 544 may include presenter sound features (e.g., features of the audio of the audio stream 512). The output of the third module 536 may be provided to a sixth module 546. The sixth module 546 may be configured as an instance of network 400 to perform LSTM. The output of the sixth module 546 may include presenter visual features (e.g., features of the movement and behavior of a presenter or other subject in the video stream 514).

The multimodal model 530 may also be configured to process a given audience member 522. Specifically, the architecture of multimodal model 530 may include the following: a seventh module 552 may be configured to process text messages 524 of a given audience member 522; and an eighth module 554 may be configured to process graphical messages 526 of the given audience member 522. The seventh module 552 may be configured to perform textual processing of the text messages 524, such as an instance of network 400 as a convolutional neural network. The eighth module 554 may be configured to perform graphical analysis of the graphical messages 524, such as an instance of network 400 as a convolutional neural network.

The resultant concepts (of a given audience member 522) may be unified into similar set of concepts that are logically consistent to the concepts that are the result of modules 542, 544, and 546. For example, the output of the seventh module 552 may be provided to a ninth module 562. The ninth module 562 may be configured as an instance of network 400 to perform LSTM. The output of the ninth module 562 may include audience member text features (e.g., features of the text of the text messages 524). The eighth module 554 may be provided to a tenth module 564. The tenth module 564 may be configured as an instance of network 400 to perform LSTM. The output of the tenth module 564 may include audience member visual features (e.g., features of the visual information of the graphical messages 526).

The features after regularization may be combined into one or more generalized concepts by the multimodal model 530. Specifically, a fusion module 570 may be configured to receive as input the regularized features including the following: first, presenter text features from fourth module 542; second, presenter sound features from fifth module 544; third, presenter visual features from sixth module 546; fourth, audience member text features from ninth module 562; and fifth, audience member visual features from tenth module 564. The fusion module 570 may perform unified operations without specific adjustment or conversion of the features, as the features were previously regularized or formatted similarly (e.g., the output of tenth module 564 may include text, flags, or other values in a first format and the output of fourth module 542 may also be in the first format). The processing of the fusion module 570 may include one or more neural network features on output neurons. For example, fusion module 570 may be configured to perform a concatenation operation. In another example, fusion module 570 may be configured to perform a regularization operation, such as a Softmax function, a SoftArgMax function, or other relevant normalized exponential function.

The output of the multimodal model 530 may include one or more content features. The content features may describe the live stream 510 and a given audience member 522 at a particular window of time. For example, the live stream 510 may be thirty minutes in duration and it may be processed by system 500 continuously. The live stream 510 may be processed based on a window of time defined base on one or more units. For example, each window of time may correspond to a second of a given live stream. In another example, a given live stream may be two minutes, and the given live stream may be demarcated by a first window of time having a duration of three seconds, a second window of time having a duration of seventeen seconds, a fourth window of time having a duration of forty seconds, a fifth window of time having a duration of fifty seconds, and a sixth window of time having a duration of ten seconds. For each window of time, the multimodal model 530 may perform processing to create the one or more content features. Each content features may include a plurality of content feature attributes including the following: a duration attribute 572, a time-offset attribute 574, and an output attribute 576. For example, at a first window of time starting thirty-five seconds into a live stream, the output of multimodal model 530 may include a content feature with a duration attribute 572 equal to "five seconds", a time-offset attribute equal to "thirty-five seconds after start of stream", and an output attribute 576 equal to "humorous."

The audio model 580 may be configured to receive as input a third copy of the audio stream 512-4 and the content features attributes 572, 574, and 576. The audio model 580 may include a first audio module 582, a second audio module 584, and a third audio module 586. The first audio module 582 may be configured to receive as input the third copy of the audio stream 512-4. The first audio module 582 may be configured to perform one or more formatting and processing operations on the third copy 512-4. For example, upon receipt of the third copy 512-4, the first audio module 582 may be configured to perform sound processing of audio effects, tones, musical identification. For example, the first audio module 534 may perform a Fourier Transform, a Mel Frequency Cepstrum Coefficient, and an instance of neural network 400 configured as a convolution neural network. The second audio module 584 may be configured to receive the output of the first audio module 582. The second audio module 584 may be configure as an LSTM configuration of an instance of network 400. The third audio module 586 may be configured to receive the content features from the multimodal model 530. The output of the second audio module 584 and the third audio module 586 may be provided to a second fusion module 588. The second fusion module 588 may be configured similarly to the first fusion module 570. For example, the second fusion module 588 may be configured to perform a concatenation and a regularization function. The output of the audio model 580 may be provided to a composition engine 590. The format of the output may be a particular audio signal and one or more parameters regarding the audio signal. For example, the multimodal model 530 may output an attribute of "happiness" as the content features at a window of time starting at three minutes into an example stream, and a duration of five seconds. The second fusion module 588 may output an audio signal that includes a sound that is less than five seconds long and corresponds to or is associated with "happiness", such as a triumphant horn sound.

The composition engine 390 may be a module configured to receive the audio stream 512, the video stream 514, and the output of the audio model 580. The composition engine 390 may perform one or more operations and processes to combine the output of the audio model with the stream 510. Specifically, the composition engine may generate an augmented stream 516, and the augmented stream may include one or more portions of the stream 510 and the audio signal from the second fusion module 588. For example, given an eleven second sound effect, the composition engine 390 may be configured to overlay the eleven second effect onto the audio stream 512, such that the augmented stream 516 plays both the audio stream and the eleven second sound effect. The composition engine 390 may be configured to provide the augmented stream 516 to a relevant audience member 522.

Figure 6:
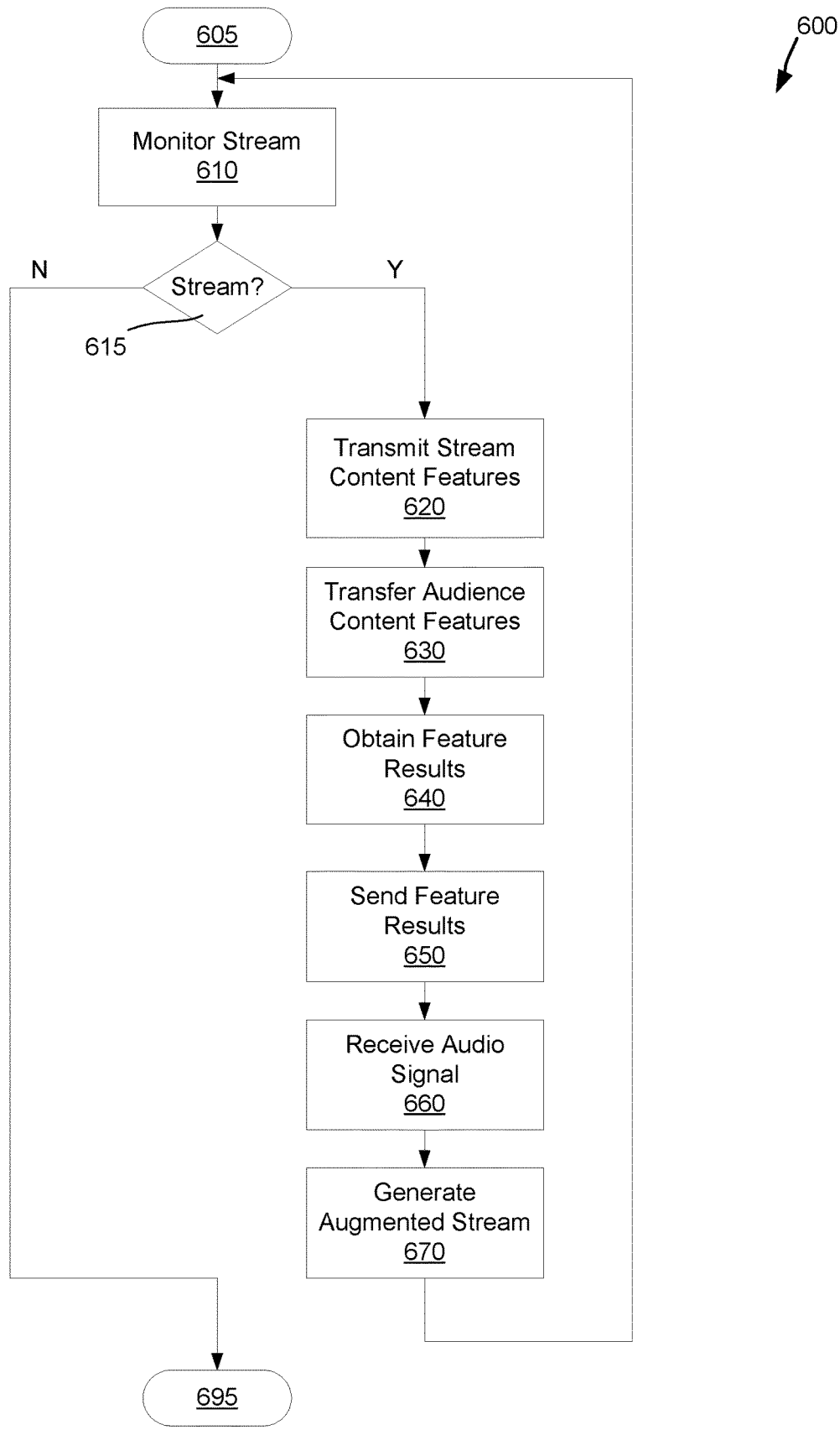
FIG. 6 depicts an example method of providing augmented streams based on the content of a user and an audience, consistent with some embodiments of the disclosure.

FIG. 6 depicts an example method 600 of providing augmented streams based on the content of a user and an audience, consistent with some embodiments of the disclosure. Method 600 may be performed by a computing device, such as computer 100. Method 600 may be performed by an RLA, such as by the RLA depicted in FIG. 5. Certain operations of method 600 may be performed by a first computing device, and other operations may be performed by a second computing device. For example, some operations may be performed by a first computer system that executes one or more neural networks. Additional operations of method 600 may be performed by a second computer system that executes one or more other preprocessing, data cleanup, formatting, or data regularization techniques. Yet additional operations of method 600 may be performed by a third computer system, such as one or more composition and audio generation techniques.

Method 600 begins at 605, when a streaming event may be monitored at 610. A streaming event may include a live stream being provided by a presenter. The live stream may include a video stream and an audio stream. The live stream may be attended by an audience that includes one or more audience members. The streaming event may be monitored to determine if the stream currently being broadcast and/or hosted for consumption by audience members. For example, if a stream is a pre-recorded movie, then monitoring the streaming event at 610 may include determining if the stream is active at a given window of time. The streaming event may be monitored directly. For example, the stream may be monitored by a server or client device operating adjacent to or communicatively coupled directly to the streaming device that is recording the stream. The streaming event may be monitored indirectly. For example, a first audience member may execute an instance of method 600 on a client device of the audience member.

If the stream is active at 615:Y, then one or more stream content features may be transmitted to an ML model at 620.

The transferring of the stream may include providing a copy of the stream audio and stream video to the model.

At 630 one or more audience content features may be transferred to the ML model. The ML model may be a multimodal model, such as multimodal model 530. The audience content features may include features of each audience member of the stream. The audience content features may be tagged based on the audience member. For example, a first audience member may connect to the stream, and may consume the stream from a client device. The client device may be assigned a unique identifier from the stream provider. The ML model may receive audience content features corresponding to the first audience member and the features may be tagged with the unique identifier.

One or more feature results may be obtained at 640. The feature results may be related to the streaming event, such as related to a window of time of the streaming event. For example, the one or more feature results may be features or attributes that describe the content of the stream at from the five-minute mark to the five-minute-and-fifteen-second mark in the stream. The feature results may be tailored to the audience members. For example, if a stream has three audience members, the ML model may provide three separate feature results that correspond to each of the three audience members.

The feature results may be sent to a second ML model. The second ML model may be audio model, such as audio model 580. The second ML model may process the input from the first ML model based on a window of time. For example, one or more features may describe the content at a particular second, a range of ten seconds, or a minute and fifteen seconds of a given live stream. The second ML model may also be provided with a copy of the audio stream (of the stream that is monitored at 610).

An audio signal may be received from the second ML model at 660. The audio signal may be generated based on one or more ML techniques to identify a proper sound to be provided as part of the audio signal. For example, the audio signal may be generated by selecting from a pre-recorded sound effect. In another example, the audio signal may be generated by choosing a relevant musical track. An augmented stream of the live stream may be generated at 670. The augmented stream may include the audio signal that was received from the second ML model. The augmented stream may include the original audio stream. For example, a composition engine or other relevant processing device may be configured to receive as input the audio signal generated from the ML model and the original audio stream of a live stream. The generated augmented stream may include one or more adjustments to the audio signal. For example, the audio signal and the audio stream may be combined by raising the relative volume or volume level of the audio signal and by recording a second audio stream that includes the first audio stream and the audio signal.

After the augmented stream is generated at 670, method 600 continues by monitoring the stream again at 610. If there is no longer a streaming event, at 615:N, method 600 ends at 695.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
monitoring, by a processing device, a live stream of a presenter, the live stream including a video stream and an audio stream that includes speech of the presenter, the live stream attended by an audience that includes a plurality of audience members interacting with the live stream;
transmitting, by the processing device and to a multimodal machine learning model, one or more stream content features of the live stream at a first window of time;
receiving for each audience member in the plurality of audience members, by the processing device, an audience content feature of one or more audience content features from a client device of a respective audience member in the plurality of audience members, wherein the audience content feature includes speech of the respective audience member;
transferring for each audience member in the plurality of audience members, by the processing device and to the multimodal machine learning model, the audience content features at the first window of time;
obtaining for each audience member in the plurality of audience members, by the processing device, one or more feature results of the first window of time from the multimodal machine learning model, the one or more feature results based on the stream content features and based on the audience content feature, wherein the one or more feature results are based at least in part on the speech of the presenter and the speech of the respective audience member in the plurality of audience members;
sending for each audience member in the plurality of audience members, by the processing device and to an auditory machine learning model, the one or more feature results of the first window of time, wherein the auditory machine learning model customizes an audio signal to each respective audience member in the plurality of audience members based at least in part on the one or more feature results associated with the speech of the presenter and the speech of the respective audience member in the plurality of audience members;
receiving for each audience member in the plurality of audience members, by the processing device, a customized audio signal from the auditory machine learning model; and
generating for each audience member in the plurality of audience members, by the processing device and based on the customized audio signal for the respective audience member in the plurality of audience members, an augmented stream of the first window of time, wherein the augmented stream includes audio that has been customized to the respective audience member that differs from the live stream of the presenter and augmented streams generated for other audience members included in the plurality of audience members.

2. The method of claim 1, wherein the augmented stream of the first window of time includes the customized audio signal.

3. The method of claim 2, wherein the augmented stream of the first window of time includes the audio stream of the live stream.

4. The method of claim 3, wherein the generating the augmented stream further comprises:
combining, by the processing device, the customized audio signal and the audio stream of the live stream.

5. The method of claim 1, wherein the audience content feature is a text message of the respective audience member.

6. The method of claim 1, wherein the audience content feature is a graphical message of the respective audience member.

7. The method of claim 1, wherein the multimodal model further comprises an instance of the multimodal machine for each audience member in the plurality of audience members to determine one or more feature results of the first window of time based on stream content features and based on an audience content feature associated with a respective audience member; and
wherein the auditory machine learning model further comprises an instance of the auditory machine learning model for each audience member in the plurality of audience members to customize an audio signal to a respective audience member.

8. The method of claim 1, wherein the one or more stream content features of the live stream are received from a streaming device of the presenter.

9. The method of claim 1, wherein the one or more stream content features of the live stream are received from a client device of an audience member in the plurality of audience members.

10. The method of claim 1, wherein the one or more stream content features include data from the video stream.

11. The method of claim 1, wherein the one or more stream content features include data from the audio stream.

12. A system comprising:
a memory, the memory containing one or more instructions; and
a processor, the processor communicatively coupled to the memory, the processor, in response to reading the one or more instructions, configured to:
monitor a live stream of a presenter, the live stream including a video stream and an audio stream that includes speech of the presenter, the live stream attended by a plurality of audience members interacting with the live stream;
transmit, to a multimodal machine learning model, one or more stream content features of the live stream at a first window of time;
receive, for each audience member in the plurality of audience members, an audience content feature of one or more audience content features from a client device of a first respective audience member that includes speech of the respective audience member;
transfer, for each audience member in the plurality of audience members, to the multimodal machine learning model, the audience content features at the first window of time;
obtain, for each audience member in the plurality of audience members, one or more feature results of the first window of time from the multimodal machine learning model, the feature results based on the stream content features and based on the audience content feature;

send, for each audience member in the plurality of audience members, to an auditory machine learning model, the feature results of the first window of time, wherein the auditory machine learning model customizes an audio signal to each respective audience member in the plurality of audience members based at least in part on the feature results associated with the speech of the presenter and the speech of the respective audience member in the plurality of audience members;

receive, for each audience member in the plurality of audience members, a customized audio signal from the auditory machine learning model; and generate, for each audience member in the plurality of audience members, based on the customized audio signal for the respective audience member in the plurality of audience members, an augmented stream of the first window of time, wherein the augmented stream includes audio customized to the respective audience member that differs from the live stream of the presenter and from augmented streams generated for other audience members included in the plurality of audience members.

13. The system of claim 12, wherein the audience content feature is a text message of the respective audience member.

14. The system of claim 12, wherein the audience content feature is a graphical message of the respective audience member.

15. A computer program product, the computer program product comprising:

one or more computer readable storage media; and program instructions collectively stored on the one or more computer readable storage media, the program instructions configured to:

monitor a live stream of a presenter, the live stream including a video stream and an audio stream that includes speech of the presenter, the live stream attended by an audience that includes a plurality of audience members interacting with the live stream;

transmit, to a multimodal machine learning model, one or more stream content features of the live stream at a first window of time;

transfer, for each audience member in the plurality of audience members, to the multimodal machine learning model, one or more audience content features of a respective audience member included in the plurality of audience members at the first window of time;

obtain, for each audience member in the plurality of audience members, one or more feature results of the first window of time from the multimodal machine learning model, the feature results based on the stream content features and based on the audience content feature of the respective audience member included in the plurality of audience members, wherein the feature results are based at least in part on the speech of the presenter and the respective audience member;

send, for each audience member in the plurality of audience members, to an auditory machine learning model, the feature results of the first window of time, wherein the auditory machine learning model customizes an audio signal to each respective audience member in the plurality of audience members based at least in part on the feature results associated with the speech of the presenter and the speech of the respective audience member in the plurality of audience members;

receive, for each audience member in the plurality of audience members, a customized audio signal from the auditory machine learning model; and generate, for each audience member in the plurality of audience members, based on the customized audio signal for the respective audience member in the plurality of audience members, an augmented stream of the first window of time, wherein the augmented stream includes audio customized to the respective audience member that differs from the live stream of the presenter and from augmented streams generated for other audience members included in the plurality of audience members.

16. The computer program product of claim 15, wherein the augmented stream of the first window of time includes the customized audio signal and the audio stream of the live stream.

17. The computer program product of claim 15, wherein the multimodal model further comprises an instance of the multimodal machine for each audience member in the plurality of audience members to determine one or more feature results of the first window of time based on stream content features and based on audience content feature associated with a respective audience member; and wherein the auditory machine learning model further comprises an instance of the auditory machine learning model for each audience member in the plurality of audience members to customize an audio signal to a respective audience member.

* * * * *